United States Patent Office 2,980,654
Patented Apr. 18, 1961

2,980,654

COPOLYMERS OF N-VINYLPYRROLIDONES WITH DIALKYL MALEATES OR FUMARATES

William M. Perry, Bethlehem, Pa., assignor to General Aniline & Film Corporation, New York, N.Y., a corporation of Delaware No Drawing. Filed Aug. 23, 1957, Ser. No. 680,026

6 Claims. (Cl. 260—78.5)

This invention relates to a new class of copolymers of N-vinylpyrrolidone with dialkyl maleates or fumarates which are water-soluble and spirit-insoluble polymers particularly adaptable in various industrial applications requiring non-sticky water-soluble plastic coatings.

It is known that polymeric N-vinylpyrrolidones, colorless horn- or glass-like materials with a high softening point, are soluble in either water or water-miscible organic solvents such as alcohol, ethylene glycol, etc. Aqueous or aqueous alcohol solutions of such polymers are employed as textile assistants, finishing, thickening, sticking, binding and pharmaceutical agents. Among their many applications, the polymers are finding use as additives in a host of cosmetic and pharmaceutical products as the water-soluble component. Films cast from such polymers are extremely brittle and friable when dry, and substantially 80 to 90% thereof will flake off the surface upon which it is cast. While polymers of this type possess many unusual properties and applications, they have been overshadowed by their lack of flexibility and lack of tackiness, i.e. as adhesives for webs of polyethylene, Mylar, Saran, aluminum, etc.

It is also known that copolymers of maleic anhydride with N-vinylpyrrolidones are colorless, glass-like resinous materials which are also soluble in water and water-miscible organic solvents. In contact with water, the maleic anhydride portion of the copolymer hydrolyzes to the free acid thereby increasing its water solubility. Films cast from such copolymers are also extremely brittle and friable and unsuitable as adhesives or plastic coatings.

The problem of providing a 1-vinyl-2-pyrrolidone polymer which resists cracking and flaking can be accomplished by the addition of a plasticizer such as diethylene glycol, dimethylphthalate, tricresyl phosphate, shellac, isopropyl palmitate, isopropyl myristate and the like. However, this has its limitations in that the use of such a plasticizer requires an additional step in the manufacture of a formulated polymer system and yields only a transitorily plasticized product.

Accordingly, it is the principal object of the present invention to provide a new class of vinylpyrrolidone-containing polymeric materials which are water-soluble, and spirit-insoluble and are permanently, internally plasticized in view of the copolymerization of the vinylpyrrolidone with certain dialkyl maleates or fumarates.

Other objects and advantages will become manifest from the following description.

I have discovered that the foregoing objects are readily accomplished by internally plasticizing vinylpyrrolidone polymer with certain dialkyl maleate or fumarate esters. The resulting polymer or copolymer contains chemically bound dialkyl maleate or fumarate ester in the ratio of 6 to 60 moles of N-vinylpyrrolidone to each mole of ester. The copolymers or modified polymers are characterized by the following general formula:

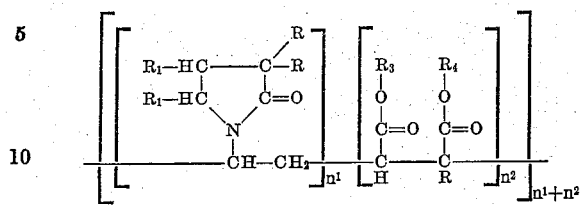

wherein R represents either hydrogen or methyl groups, $R_1$ represents either hydrogen, methyl or ethyl groups, $R_2$ represents either hydrogen or an alkyl group of 1 to 3 carbon atoms, e.g. methyl, ethyl, propyl, isopropyl, $R_3$ and $R_4$ represents an alkyl chain of from 3 to 14 carbon atoms, and $n^1+n^2$ represents a positive integer of at least 7 and at most 61 and wherein the ratio of $n^1$ to $n^2$ ranges from 6 to 60 to 1.

The modified polymers are readily prepared by the ordinary polymerization techniques. From 6 to 60 moles of the monomeric N-vinylpyrrolidone and 1 mole of a dialkyl maleate or dialkyl with fumarate with or without the usual solvent such as hexane, for example, are charged in the usual 3-necked Pyrex vessel equipped with a reflux condenser, a gas inlet connection, a mechanical stirrer and a thermometer. The vessel is flushed with an inert gas such as nitrogen or carbon dioxide. Any type of polymerization catalyst used for polymerizing N-vinylpyrrolidone is then added. I prefer, however, to employ 2,2'-azodiisobutyronitrile as the catalyst. After the addition of the catalyst, the vessel is heated and the contents stirred for several hours until the unsaturation is dropped to an acceptable amount. This is determined by hydrogenation of a sample dissolved in hexane in the presence of a palladium catalyst on a charcoal carrier. The unsaturation is directly related to the amount of hydrogen taken up and bound by the polymer. The modified polymer is then recovered by vacuum stripping or removed from the reaction vessel and immediately employed without removal of any solvent if a solvent was employed during the addition polymerization reaction.

The following are examples of polymerizable N-vinylpyrrolidones which may be modified in accordance with the present invention:

N-vinyl-2-pyrrolidone
N-vinyl-5-methyl pyrrolidone
N-vinyl-5-ethyl pyrrolidone
N-vinyl-3,3-dimethyl pyrrolidone
N-vinyl-3-methyl pyrrolidone
N-vinyl-4-methyl pyrrolidone
N-vinyl-4-ethyl pyrrolidone As examples of dialkyl maleates and dialkyl fumarates, the following are illustrative:

Dialkyl maleates and substituted dialkyl maleates:
   α-Methyl dipropyl maleate
   α-Methyl dibutyl maleate
   α-Ethyl dibutyl maleate
   α-Propyl dibutyl maleate
   α-Ethyl dioctyl maleate
   α-Ethyl tetradecyl maleate
   Dipropyl maleate
   Dibutyl maleate
   Diamyl maleate Dihexyl maleate
Diheptyl maleate
Dioctyl maleate
Dinonyl maleate
Di-dodecyl maleate
Di-2-ethylhexyl maleate
Di-tetradecyl maleate Dialkyl fumarates:
Dipropyl fumarate
Dibutyl fumurate
Diamyl fumarate
Dihexyl fumurate
Di-2-ethylhexyl fumurate
Diheptyl fumurate
Dioctyl fumurate
Dinonyl fumurate
Di-decyl fumurate
Di-dodecyl fumurate
Di-tridecyl fumarate
Di-tetradecyl fumurate I have found that polymers containing N-vinylpyrrolidone and dialkyl maleates or dialkyl fumarates fall into two general classes based on their properties. Thus, as I have shown in my copending application, Ser. No. 680,027, filed on even date herewith, where the molar ratio of N-vinylpyrrolidone to dialkyl maleate or dialkyl fumarate is varied from 1 mole of N-vinylpyrrolidone/1 mole of dialkyl maleate or dialkyl fumarate to about 5 moles of N-vinylpyrrolidone/1 mole of dialkyl maleate or dialkyl fumurate, the polymers are soft, tacky, pressure-sensitive, insoluble in water and soluble in hexane. I have also found, and my invention herein is based on this discovery, that where the molar ratio of N-vinylpyrrolidone to dialkyl maleate or dialkyl fumarate is not less than 6 moles and not substantially more than 60 moles of N-vinylpyrrolidone to each mole of a diester, the polymers are soluble in water, insoluble in hexane, and form stable films. This is illustrated by the following calculation:

$$\frac{n^1}{n^1+n^2} = 0.86 \text{ to } 0.98 \text{ (by moles)}$$

and $$\frac{n^2}{n^1+n^2} = 0.4 \text{ to } 8.017 \text{ (by moles)}$$

where $n^1$=moles of N-vinyl-2-pyrrolidone and $n^2$=moles of dialkyl maleate or fumarate.

Example I

Into a three-necked, one-liter Pyrex flask equipped with an Allihn condenser, a stirrer, a thermometer and a nitrogen inlet was charged: 95.0 grams (0.856 mole) of distilled N-vinyl-2-pyrrolidone, 5.0 grams (0.0147 mole) of di-2-ethyl hexyl maleate and 100.0 grams of hexane.

The flask was flushed with nitrogen and the inlet rate adjusted to about 30 bubbles per minute. The flask was then heated to 60° C. with stirring for 30 minutes. After this was added: 0.1 gram 2,2'-azodiisobutyronitrile as the catalyst. The flask was stirred and maintained at 55° C.±5° C. for eight hours. No large exotherm was observed.

The final product was a finely divided, white, easily settled precipitate which was filtered from the hexane.

Analysis of the product showed a corrected nitrogen content of 11.5%. The material also gave a Fikentscher K-value of 77.7 in anhydrous ethanol. The material was water soluble.

Example II

Into a three-necked, one-liter Pyrex flask equipped with an Allihn condenser, a mechanical stirrer, a thermometer and a nitrogen inlet was charged: 90.0 grams (0.81 mole) of distilled N-vinyl-2-pyrrolidone, 10.0 grams (0.029 mole) of di-2-ethyl hexyl maleate and 100.0 grams of hexane.

The flask was flushed with nitrogen and the inlet rate adjusted to about 30 bubbles per minute. The flask was stirred and heated to 55° C. for 30 minutes. After this was added 0.1 gram of 2,2'-azodiisobutyronitrile as catalyst. The flask was then stirred and maintained at 60° C.±5° C. for eight hours. No large exotherm was observed.

The final product was a finely divided, easily settled, white precipitate. The product gave a Fikentscher K-value of 69.7 in anhydrous ethanol. The nitrogen content was 11.5%. The material was soluble in water.

Example III

Into a three-necked, one-liter Pyrex flask equipped with an Allihn condenser, a mechanical stirrer, a thermometer, and a nitrogen inlet was charged: 20.0 grams (0.059 mole) of di-2-ethylhexyl maleate, 80.0 grams (0.72 mole) of distilled N-vinyl-2-pyrrolidone and 100.0 grams of hexane.

The flask was flushed with nitrogen and the inlet rate adjusted to about 30 bubbles per minute. The flask was then heated to 60° C. for 30 minutes. After this was added 2.1 gram of 2,2'-azodiisobutyronitrile as the catalyst. The flask was stirred and maintained at 60° C. for a total of eight hours.

The final product was a finely divided white precipitate. The product contained on analysis 9.34% nitrogen and gave a Fikentscher K-value of 49.5 in anhydrous methanol.

Example IV

Into a three-necked, one-liter Pyrex flask equipped with an Allihn condenser, a mechanical stirrer, a thermometer, and a nitrogen inlet was charged: 34.0 grams (0.1 mole) di-2-ethylhexyl phthalate, 66.0 grams (0.6 mole) distilled N-vinyl-2-pyrrolidone and 100.0 grams hexane.

The flask was flushed with nitrogen and the inlet rate adjusted to 30 bubbles per minute. The flask was then stirred and heated to 60° C. for 30 minutes. After this was added 0.1 gram 2,2'-azodiisobutyronitrile as the catalyst. The flask was stirred and maintained at 60° C.±5° C. for a total of eight hours.

The final product was a hazy, sticky, precipitate. The material was separated by decantation and the product recovered by drying. The final product was a white, tough, flexible, slightly sticky polymer.

Example V

Into a three-necked, one-liter Pyrex flask equipped with an Allihn condenser, a mechanical stirrer, a thermometer, and a nitrogen inlet was charged: 95.0 grams of distilled N-vinyl-2-pyrrolidone, 5.0 grams of didodecyl maleate and 200.0 grams of hexane.

The flask was flushed with nitrogen and the inlet rate adjusted to about 30 bubbles per minute. The flask was heated to 70° C. for 30 minutes. After this was added 0.1 gram 2,2'-azodiisobutyronitrile as catalyst. The flask was stirred and maintained at 70° C. for a total of twelve hours.

The final product was a white, finely divided, precipitate which was recovered by filtration.

Example VI

Into a three-necked, one-liter Pyrex flask equipped with an Allihn condenser, a mechanical stirrer, a thermometer, and a nitrogen inlet was charged: 70.0 grams (0.63 mole) of distilled 1-vinyl-2-pyrrolidone, 30.0 grams (0.081 mole) of didodecyl maleate and 200.0 grams of hexane.

The flask was flushed with nitrogen and the inlet rate adjusted to about 30 bubbles per minute. The flask was then heated to 70° C. for 30 minutes. After this was added 0.1 gram of 2,2'-azodiisobutyronitrile as catalyst.

The flask was stirred and maintained at 70° C. for twelve hours.

The final product which was recovered by filtration was a white, non-tacky, hexane insoluble material.

The product on analysis contained 8.62% nitrogen.

*Example VII*

This example illustrates the preparation and use of an aerosol hair fixative containing a copolymer of N-vinyl-2-pyrrolidone and di-2-ethyl hexyl maleate.

Into a Fischer-Porter aerosol compatibility glass tube were condensed or added the following:

| | G. |
|---|---|
| Trichloromonofluoromethane (Freon 11—E. I. du Pont) | 50.0 |
| Dichlorodifluoromethane (Freon 12—E. I. du Pont) | 40.0 |
| Copolymer | 1.9 |
| Ethanol anhydrous | 7.0 |
| Total | 63.9 |

The tube was removed from the solid carbon dioxide acetone bath and sealed with a nozzle assembly. The tube was allowed to warm to room temperature resulting in a uniform solution of the ingredients.

The completed aerosol was used to spray a glass panel 8" x 10". A clear, odorless, slightly tacky, continuous coating was obtained. A similar panel sprayed with a commercial aerosol hair fixative containing polyvinylpyrrolidone gave a clear, continuous film; however, the film was very sticky and had an ammoniacal, amine-like odor.

Hair sprayed with above-specified copolymer spray did not feel sticky and it was noted the gloss and brightness were improved. The copolymer spray had practically no odor.

It is to be understood that the foregoing detailed description is merely given by way of illustration and that many variations may be made therein without departing from the spirit of my invention.

Having described my invention, what I desire to secure by Letters Patent is:

1. A polymeric material characterized by the following general formula:

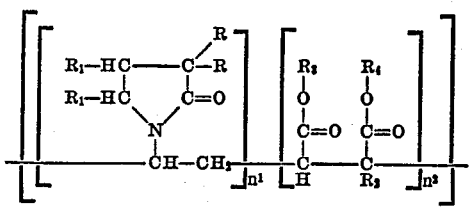

wherein R represents a member selected from the class consisting of hydrogen and methyl groups, $R_1$ represents a member selected from the class consisting of hydrogen, methyl and ethyl groups, $R_2$ represents a member selected from the class consisting of hydrogen and alkyl groups of from 1 to 3 carbon atoms, $R_3$ and $R_4$ each represents an alkyl chain of from 3 to 14 carbon atoms, and wherein the ratio of $n^1$ to $n^2$ ranges from 6 to 1 to 60 to 1, said material being water-soluble, hexane-insoluble and capable of forming stable clear and substantially non-tacky films.

2. A polymeric material having the following formula:

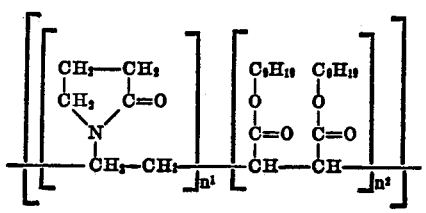

wherein the ratio of $n^1$ to $n^2$ ranges from 6 to 1 to 60 to 1, said material being water-soluble, hexane-insoluble and capable of forming stable clear and substantially non-tacky films.

3. A polymeric material having the following formula:

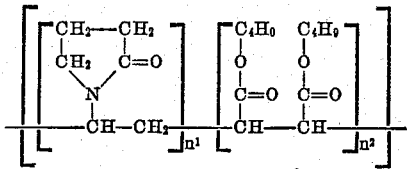

wherein the ratio of $n^1$ to $n^2$ ranges from 6 to 1 to 60 to 1, said material being water-soluble, hexane-insoluble and capable of forming stable clear and substantially non-tacky films.

4. A polymeric material having the following formula:

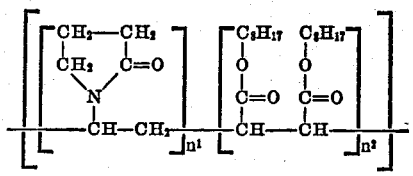

wherein the ratio of $n^1$ to $n^2$ ranges from 6 to 1 to 60 to 1, said material being water-soluble, hexane-insoluble and capable of forming stable clear and substantially non-tacky films.

5. A polymeric material having the following formula:

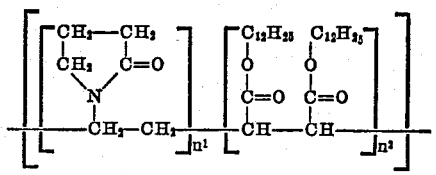

wherein the ratio of $n^1$ to $n^2$ ranges from 6 to 1 to 60 to 1, said material being water-soluble, hexane-insoluble and capable of forming stable clear and substantially non-tacky films.

6. A polymeric material having the following formula:

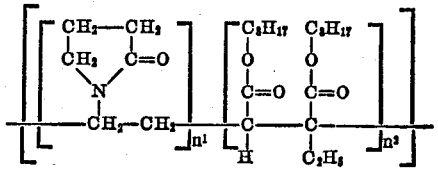

wherein the ratio of $n^1$ to $n^2$ ranges from 6 to 1 to 60 to 1, said material being water-soluble, hexane-insoluble and capable of forming stable clear and substantially non-tacky films.

References Cited in the file of this patent

UNITED STATES PATENTS

| 2,335,454 | Schuster et al. | Nov. 13, 1943 |
| 2,471,959 | Hunt | May 31, 1949 |
| 2,497,705 | Werntz | Feb. 14, 1950 |
| 2,594,560 | Howard | Apr. 29, 1952 |
| 2,667,473 | Morner | Jan. 26, 1954 |
| 2,676,949 | Morner et al. | Apr. 27, 1954 |
| 2,827,359 | Kine et al. | Mar. 18, 1958 |
| 2,831,836 | Forchielli | Apr. 22, 1958 |

FOREIGN PATENTS

| 487,593 | Great Britain | June 22, 1938 |

OTHER REFERENCES

Schildknecht: "Vinyl and Related Polymers," Wiley (1952), p. 707.

De Bell et al.: "German Plastics Practice," De Bell and Richardson (1946), pp. 518–519.